Aug. 25, 1942.　　　　E. M. KRUEGER　　　　2,293,987

FLOW METER

Filed March 24, 1941

INVENTOR
EMIL M. KRUEGER
BY Wheeler, Wheeler & Wheeler

Patented Aug. 25, 1942

2,293,987

UNITED STATES PATENT OFFICE 2,293,987

FLOW METER

Emil M. Krueger, Milwaukee, Wis., assignor to Badger Meter Manufacturing Company, Milwaukee, Wis., a corporation of Wisconsin Application March 24, 1941, Serial No. 384,797

4 Claims. (Cl. 73—210)

This invention relates to improvements in flow meters.

It is the primary object of the invention to provide a meter which is easily read and which will accurately indicate the flow of a liquid over a wide range.

More specifically, it is my purpose to provide a novel and improved meter organization which can be coupled into any line to indicate the rate of flow of liquids therethrough without requiring the use of stuffing boxes or packed bearings and yet in a manner permitting the exact rate of flow to be sensitively indicated and accurately read.

Other objects of the invention include the provision of means for keeping the metering plug from rotation while permitting it full freedom of axial movement; means for adequately controlling and accurately guiding the metering plug; means for resiliently limiting the range of movement in the metering plug whereby its projection into the outlet port is precluded in the event that the flow of movement temporarily exceeds the range for which the device is adapted; the provision of a novel and improved assembly of the casing parts and the gauge; and the provision of a novel and improved design of plug itself.

A further object is generally to simplify and improve the construction, arrangement and operation for one or more of the purposes mentioned, and still other objects will be apparent from the specification.

In the drawing.

Like parts are identified by the same reference characters throughout the several views.

Figure 2:
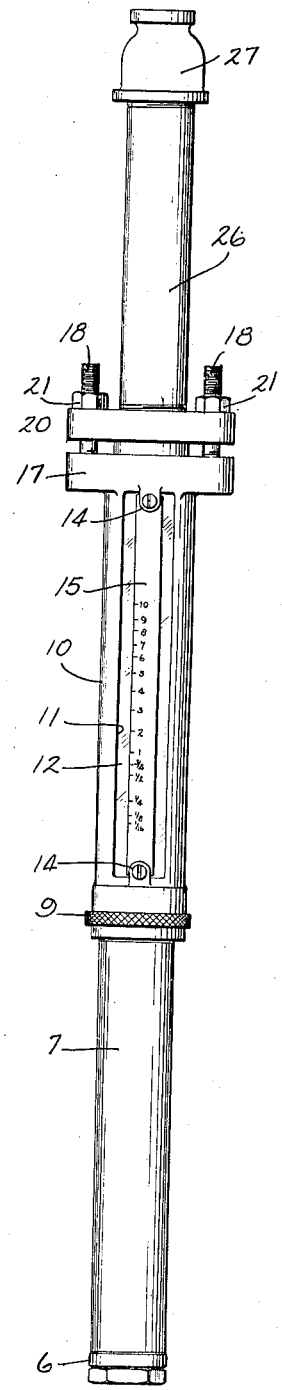
Fig. 2 is a view in side elevation of the device shown in Fig. 1.
Figure 3:
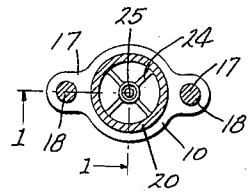
Fig. 3 is a detail view taken on the line 3—3 of Fig. 1.
Figure 4:
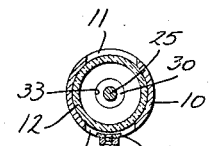
Fig. 4 is a detail view taken in section on line 4—4 of Fig. 1.

The barrel of the device is a tube made up of a number of sections and adapted to be connected in a flow line such as the line which supplies a water meter requiring calibration. The particular flow meter here disclosed is one that is particularly designed and adapted to measure extremely low rates of flow. It has been found accurate down to flows of less than one hundred drops per minute. It is, however, preferably calibrated in a range from $\frac{1}{16}$ gallon to 10 gallons per minute as shown in Fig. 2.

The barrel is preferably set in a vertically upright position. Its lowest section comprises a coupling 6 for the lower end of the sleeve 7. Extending along the inner surface of the sleeve at one side is a piece of wire 8 having its outwardly turned ends soldered into holes in the sleeve as a means of anchoring the wire to enable it to function as a key for the guidance of one end of the metering plug hereinafter to be described.

Into the upper end of the sleeve section 7 of the barrel of the meter is screwed an annular coupling head 9. Screw threaded to the head 9 is a generally tubular casting 10 having one or more longitudinally extending windows at 11 exposing a tubular gauge glass 12 which fits closely within the casting 10 and is supported and confined thereby. The upper end of the coupling 9 is shouldered to receive a gasket 13 which serves as a packing and seat for the lower end of the gauge glass 12.

Adjacent one of the windows 11 the casting 10 has upper and lower ears 14 to which the gauge strip 15 is fastened directly before the window where the register marks or calibrations on the gauge strip are readily visible in properly registered positions with respect to the movement within the gauge glass of the metering plug hereinafter to be described.

Figure 1:
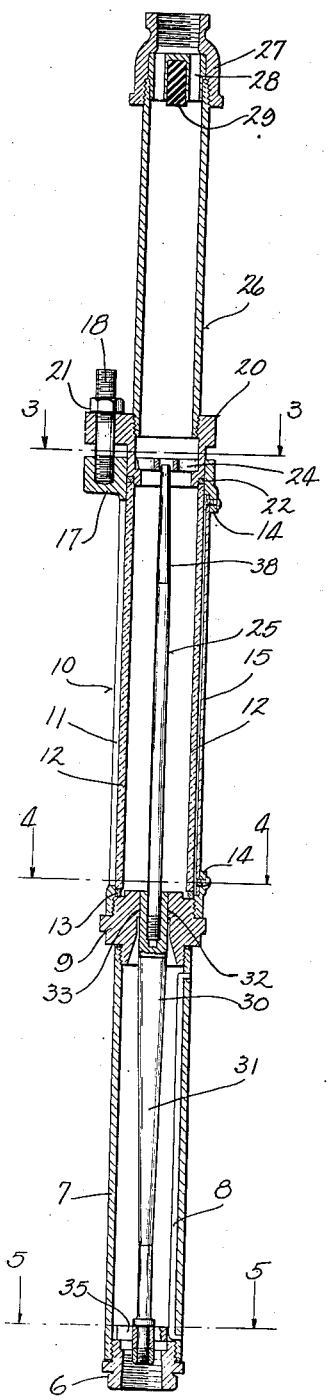
Fig. 1 shows in axial section on the line 1—1 of Fig. 3 a device embodying the invention.

At its upper end the casting 10 is enlarged at 17 to receive connecting bolts 18 which pass through correspondingly enlarged portions of a coupling 20 and receive nuts 21 to maintain the gauge glass under packing pressure. The lower end of coupling 20 telescopes into the casting 10 as best shown in Fig. 1 and is externally shouldered to provide a seat within which gasket 22 packs the upper end of the gauge glass 12 in the same manner that gasket 13 packs the lower end thereof.

It will be obvious that the tightening of the nuts 21 upon studs 18 will draw coupling element 20 toward coupling element 9, thereby clamping both of the packing gaskets upon the opposing ends of the gauge glass.

Coupling 20 is provided internally with an integral spider 24 at the center of which there is a guide bearing opening for the guide rod 25 of the metering plug.

Screw threaded into coupling element 20 is another section of the barrel of the device comprising a pipe or sleeve 26 to which the terminal coupling 27 is applied. Within the terminal coupling 27 another spider 28 centrally supports a cushion 29 limiting the movement of the metering plug while permitting free flow of liquid around such cushion.

The metering plug 30 has an elongated frusto-conically tapered and accurately finished surface at 31. The upper end portion 32 of the metering plug is cylindrical and closely fitted to the orifice 33 in the coupling element 9. The fit is preferably so perfect that liquid cannot flow through the device without lifting the plug at least sufficiently to clear its cylindrical upper end portion 32 beyond the orifice and to register some part of the tapered portion 31 thereof in the orifice, according to the amount of liquid flowing.

Figure 5:
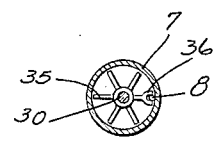
Fig. 5 is a detail view taken in section on line 5—5 of Fig. 1.

At its lower end the metering plug 30 carries a spider 35, which is shown in detail in Fig. 5. It preferably has several arms engaging the inner surface of the lower sleeve 7 of the barrel, one of such arms at 36 being bifurcated to engage the key 8 and thereby to preclude the plug 30 from rotation.

Threaded into the abruptly shouldered upper cylindrical end portion 32 of the plug 30, is the guide rod 25 already referred to. This guide rod preferably, though not necessarily, has a tapered end 38 loosely extending through the central aperture in spider 24 of coupling element 20.

When liquid flow occurs through the barrel in a vertically upward direction, the first pressure differential to which the metering plug is subject will lift the cylindrical portion 32 of the metering plug above the orifice 33, thereby bringing some part of the tapered portion 31 of the plug into the orifice. The taper of portion 31 of the plug varies the clearance between the plug and the orifice 33 and the plug will automatically adjust itself to a position such that the clearance afforded will be appropriate to the delivery of the liquid at the rate at which such liquid is flowing.

The clearance will be uniform around the plug. In other words, the plug will be symmetrically centered in the orifice at all times. This is due to the fact that the plug is guided at extremely remotely separated points by the upper bearing spider 24, stationary within the barrel, and the lower guiding spider 35, movable with the plug. In practice the plug virtually floats in the moving stream of liquid, being suspended therein by the fact that any tendency of the plug to descend will increase the differential pressure at the orifice by restricting the orifice. The level at which the plug will be suspended in the floating liquid will be proportional to the volume of flow, and hence the operator is readily able to ascertain the flow with accuracy by simply noting the calibration of the gauge strip 15 opposite which the flat upper end of the plug 30 comes to rest. To make the location of the plug readily apparent through the gauge glass 12, it is preferred that the plug and its guide rod 25 be made of contrasting colors. For example, the guide rod may conveniently be made of brass and the plug of some highly polished metal. Visibility is further enhanced by the fact that the casting 10 which surrounds the gauge glass preferably has openings on both sides so that light shines completely through the meter.

Due to the suspension principle and the vertical disposition of the meter, its operation is practically frictionless, there being very little pressure contact between the plug and any stationary part.

By suspending the metering pin substantially centered in an orifice in the path of a vertically moving stream and reading the flow directly with reference to the pin, my improved meter gives exceedingly accurate readings.

This application is a companion to another application for patent on like subject matter showing a specifically different form of meter and filed of even date herewith.

I claim:

1. A flow meter comprising the combination with a substantially upright barrel, of an annular fitting in an intermediate portion thereof providing an orifice, guide means in said barrel above and below the orifice and a metering pin having a conically tapered portion normally disposed below said orifice and centered by said guide means, said pin being gravity biased to normally register a relatively large diametered portion in said orifice and adapted to be lifted and held in suspension by an upwardly flowing stream of liquid to vary the height of said pin in said orifice and correspondingly to vary the clearance between the tapered pin and the orifice, and a stop cushion in the path of said guide means adapted to limit the range of pin movement, said pin and its guide means being adapted for free floating movement in a stream of liquid passing through said barrel, and said barrel having a calibrated transparent portion through which the pin may be viewed.

2. In a flow meter, the combination of a barrel having a metering section and a superposed transparent wall portion connected by an annular fitting provided with a flow controlling orifice, a downwardly tapering metering pin having its larger diameter normally in registry with said orifice in sliding fit relation to the wall thereof, means remote from the respective ends of the metering pin for keeping it centered in said orifice in its various positions of vertical adjustment and limiting its axial movement, and means for delivering a stream of water upwardly through said barrel, the metering pin being free floating in said stream and visible through said transparent wall portion.

3. In a flow meter, an elongated barrel having a metering section provided with an inlet fitting at its lower end, a flow controlling annular fitting at its upper end, a metering pin having its upper end disposed in said annular fitting and conically tapered downwardly therefrom, a guiding spider connected with the lower end of the metering pin and provided with a forked arm, and a vertically disposed rod secured to the inner face of the metering section and with which said forked arm is loosely engaged, whereby said spider is adapted to center the metering pin and hold the same against rotation.

4. A flow meter, comprising a vertically disposed tubular barrel having inlet and outlet fittings at its lower and upper ends, respectively, an intermediate annular fitting providing a metering orifice, a metering pin having a cylindrical upper end normally in sliding fit relation to the orifice, with a depending downwardly tapered portion in the form of an inverted frustrum of a cone, and means connected with opposite ends of the metering pin for centering the pin in said orifice and limiting its range of movement therein, the cylindrical portion of the pin being of a diameter to prevent liquid flow through said orifice when in registry therewith and said pin being adapted for free floating movement in a stream of liquid moving upwardly through the barrel under pressure sufficient to overcome the weight of the pin.

EMIL M. KRUEGER.